United States Patent
Knight et al.

(10) Patent No.: US 7,203,198 B2
(45) Date of Patent: Apr. 10, 2007

(54) SYSTEM AND METHOD FOR SWITCHING ASYNCHRONOUS TRANSFER MODE CELLS

(75) Inventors: Brian James Knight, Cambridge (GB); Timothy John Chick, Bedfordshire (GB)

(73) Assignee: Conexant, Inc., Red Bank, NJ (US)

( * ) Notice: Subject to any disclaimer, the term of this patent is extended or adjusted under 35 U.S.C. 154(b) by 963 days.

(21) Appl. No.: 10/063,384

(22) Filed: Apr. 17, 2002

(65) Prior Publication Data
US 2002/0176424 A1 Nov. 28, 2002

Related U.S. Application Data

(60) Provisional application No. 60/284,168, filed on Apr. 17, 2001.

(51) Int. Cl.
*H04L 12/28* (2006.01)
*H04L 12/66* (2006.01)
*H04J 3/24* (2006.01)

(52) U.S. Cl. .............. 370/395.54; 370/354; 370/395.7; 370/430; 370/474

(58) Field of Classification Search ............... 370/474, 370/472, 535, 537, 389, 471, 395, 310, 347, 370/341, 342, 335, 320, 503, 349, 338, 397, 370/399, 401, 522, 465, 466, 467, 469, 475, 370/476, 479, 442, 395.54, 395.1, 395.2, 370/395.3, 395.5, 395.4, 412, 413, 415, 416, 370/417, 418, 419, 429, 235, 392, 230, 252, 370/400, 402, 406, 407, 408, 414, 430, 242, 370/354, 356, 395.7

See application file for complete search history.

(56) References Cited

U.S. PATENT DOCUMENTS

| | | | |
|---|---|---|---|
| 5,272,696 A | * | 12/1993 | Munter et al. ........... 370/395.7 |
| 5,301,192 A | | 4/1994 | Henrion |
| 5,446,726 A | | 8/1995 | Rostoker et al. |
| 5,452,330 A | | 9/1995 | Goldstein |
| 5,625,825 A | | 4/1997 | Rostoker et al. |
| 5,640,399 A | | 6/1997 | Rostoker et al. |
| 5,654,962 A | | 8/1997 | Rostoker et al. |
| 5,668,809 A | | 9/1997 | Rostoker et al. |
| 5,710,770 A | | 1/1998 | Kozaki et al. |
| 5,717,688 A | | 2/1998 | Belanger et al. |
| 5,729,680 A | | 3/1998 | Belanger et al. |

(Continued)

*Primary Examiner*—Afsar Qureshi
(74) *Attorney, Agent, or Firm*—Thomas, Kayden, Horstemeyer & Risley

(57) ABSTRACT

One embodiment of a method for switching ATM cells using Early Packet Discard and Partial Packet Discard is provided. Initially, a first cell of an AAL5 packet is received at an input port. Next, it is determined whether there is likely to be enough buffering available to handle the whole packet (i.e., up to 64 Kbytes). If it is determined that sufficient buffering is unlikely to be available, the entire packet is discarded. If it is determined that sufficient buffering exists, the cell is received and buffered for subsequent transmission. Next it is determined whether the flow's buffer is filled at any time after initial transmission of a AAL5 cell but before reception of the final cell. If such a state is determined, the current cell is discarded and a flag is set in the flow structure so that subsequent cells of the same packet, except the last, will also be discarded.

23 Claims, 6 Drawing Sheets

U.S. PATENT DOCUMENTS

| | | |
|---|---|---|
| 5,799,014 A | 8/1998 | Kozaki et al. |
| 5,802,052 A | 9/1998 | Venkataraman |
| 5,802,287 A | 9/1998 | Rostoker et al. |
| 5,838,730 A | 11/1998 | Cripps |
| 5,838,904 A | 11/1998 | Rostoker et al. |
| 5,875,186 A | 2/1999 | Belanger et al. |
| 5,936,967 A * | 8/1999 | Baldwin et al. ............ 370/474 |
| 5,953,336 A | 9/1999 | Moore et al. |
| 5,963,543 A | 10/1999 | Rostoker et al. |
| 6,016,317 A | 1/2000 | Sakurai et al. |
| 6,052,373 A | 4/2000 | Lau |
| 6,081,518 A | 6/2000 | Bowman-Amuah |
| 6,088,356 A * | 7/2000 | Hendel et al. ............... 370/392 |
| 6,094,435 A * | 7/2000 | Hoffman et al. ............ 370/414 |
| 6,101,187 A | 8/2000 | Cukier et al. |
| 6,101,190 A | 8/2000 | Song et al. |
| 6,122,279 A | 9/2000 | Milway et al. |
| 6,147,975 A | 11/2000 | Bowman-Amuah et al. |
| 6,148,000 A | 11/2000 | Feldman et al. |
| 6,597,689 B1 * | 7/2003 | Chiu et al. ................... 370/354 |

\* cited by examiner

SYSTEM AND METHOD FOR SWITCHING ASYNCHRONOUS TRANSFER MODE CELLS

CROSS REFERENCE TO RELATED APPLICATIONS

This application claims the benefit of U.S. provisional patent application Ser. No. 60/284,168 filed Apr. 17, 2001, the disclosure of which is incorporated herein by reference.

BACKGROUND OF THE INVENTION

The present invention relates generally to data communication networks and, more particularly, to transmission control mechanisms, including ATM communications processors and switches, and cell reception and header interpretation in asynchronous transfer mode systems/networks.

With the proliferation of the digital age, increasing need has arisen for a single versatile networking technology capable of efficiently transmitting multiple types of information at high speed across different network environments. In response to this need, the International Telegraph and Telephone Consultative Committee (CCITT), and its successor organization, the Telecommunications Standardization Sector of the International Telecommunication Union (ITU-T), developed Asynchronous Transfer Mode, commonly referred to as ATM, as a technology capable of the high speed transfer of voice, video, and data across public and private networks.

ATM utilizes very large-scale integration (VLSI) technology to segment data into individual packets, e.g., B-ISDN calls for packets having a fixed size of 53 bytes or octets. These packets are commonly referred to as cells. Using the B-ISDN 53-byte packet for purposes of illustration, each ATM cell includes a header portion comprising the first 5 bytes and a payload portion comprising the remaining 48 bytes. ATM cells are routed across the various networks by passing though ATM switches, which read addressing information included in the cell header and deliver the cell to the destination referenced therein. Unlike other types of networking protocols, ATM does not rely upon Time Division Multiplexing in order to establish the identification of each cell. That is, rather than identifying cells by their time position in a multiplexed data stream, ATM cells are identified solely based upon information contained within the cell header.

Further, ATM differs from systems based upon conventional network architectures such as Ethernet or Token Ring in that rather than broadcasting data packets on a shared wire for all network members to receive, ATM cells dictate the successive recipient of the cell through information contained within the cell header. That is, a specific routing path through the network, called a virtual path (VP) or virtual circuit (VC), is set up between two end nodes before any data is transmitted. Cells identified with a particular virtual circuit are delivered to only those nodes on that virtual circuit. In this manner, only the destination identified in the cell header receives the transmitted cell.

The cell header includes, among other information, addressing information that essentially describes the source of the cell or where the cell is coming from and its assigned destination. Although ATM evolved from Time Division Multiplexing (TDM) concepts, cells from multiple sources are statistically multiplexed into a single transmission facility. Cells are identified by the contents of their headers rather than by their time position in the multiplexed stream. A single ATM transmission facility may carry hundreds of thousands of ATM cells per second originating from a multiplicity of sources and traveling to a multiplicity of destinations.

The backbone of an ATM network consists of switching devices capable of handling the high-speed ATM cell streams. The switching components of these devices, commonly referred to as the switch fabric, perform the switching function required to implement a virtual circuit by receiving ATM cells from an input port, analyzing the information in the header of the incoming cells in real-time, and routing them to the appropriate destination port. Millions of cells per second need to be switched by a single device.

Importantly, this connection-oriented scheme permits an ATM network to guarantee the minimum amount of bandwidth required by each connection. Such guarantees are made when the connection is set-up. When a connection is requested, an analysis of existing connections is performed to determine if enough total bandwidth remains within the network to service the new connection at its requested capacity. If the necessary bandwidth is not available, the connection is refused.

In order to achieve efficient use of network resources, bandwidth is allocated to established connections under a statistical multiplexing scheme. Therefore, congestion conditions may occasionally occur within the ATM network resulting in cell transmission delay or even cell loss. To ensure that the burden of network congestion is placed upon those connections most able to handle it, ATM offers multiple grades of service. These grades of service support various forms of traffic requiring different levels of cell loss probability, transmission delay, and transmission delay variance, commonly known as delay jitter. It is known, for instance, that many multimedia connections, e.g., video streams, can tolerate relatively large cell losses, but are very sensitive to delay variations from one cell to the next. In contrast, traditional forms of data traffic are more tolerant of large transmission delays and delay variance, but require very low cell losses. This variation in requirements can be exploited to increase network performance.

The design of conventional ATM switching systems involves a compromise between which operations should be performed in hardware and which in software. Generally, but not without exception, hardware gives optimal performance, while software allows greater flexibility and control over scheduling and buffering, and makes it practical to have more sophisticated cell processing (e.g., OAM cell extraction, etc.).

Additional background information pertaining to ATM can be found in a number of sources and need not be repeated directly herein. For example, U.S. Pat. No. 6,122,279 (Milway et al.), assigned to the assignee of the present invention, provides a thorough description of ATM and is incorporated herein by reference. In addition, U.S. Pat. No. 5,953,336 (Moore et al.), also assigned to the assignee of the present invention, provides background on ATM traffic shaping, among other things, and is likewise incorporated herein by reference.

Therefore in order to overcome the present ATM switching deficiencies, there is a need in the art for a more flexible method and system for switching ATM cells.

SUMMARY OF THE INVENTION

The present invention overcomes the problems noted above, and realizes additional advantages, by providing for methods and systems for switching cells in an ATM network. In particular, a combination of hardware and software techniques is provided for enabling a system to switch ATM cells between multiple ports. It supports VP (virtual path) and VC (virtual circuit) switching, per-circuit queuing, multiple priorities, and multicast. The switching and buffering operations are handled entirely in software, which gives extensibility for supporting extra processing (such as Early Packet Discard (EPD) and Partial Packet Discard (PPD)), and is flexible in other ways (e.g. supporting multicasts with more than one branch per port, or multicasts with some branches switched and some terminated locally).

One embodiment of a method for switching ATM cells using EPD and PPD is provided. Initially, a first cell of an AAL5 packet is received at an input port. Next, it is determined whether there is likely to be enough buffering available to handle the whole packet (i.e., up to 64 Kbytes). If it is determined that sufficient buffering is unlikely to be available, the entire packet is discarded. If it is determined that sufficient buffering exists, the cell is received and buffered for subsequent transmission. Next it is determined whether the flow's buffer is filled at any time after initial transmission of a AAL5 cell but before reception of the final cell. If such a state is determined, the current cell is discarded and a flag is set in the flow structure so that subsequent cells of the same packet, except the last, will also be discarded.

BRIEF DESCRIPTION OF THE DRAWINGS

The present invention can be understood more completely by reading the following Detailed Description of the Invention, in conjunction with the accompanying drawings, in which.

DETAILED DESCRIPTION OF THE PREFERRED EMBODIMENTS

Figure 1:
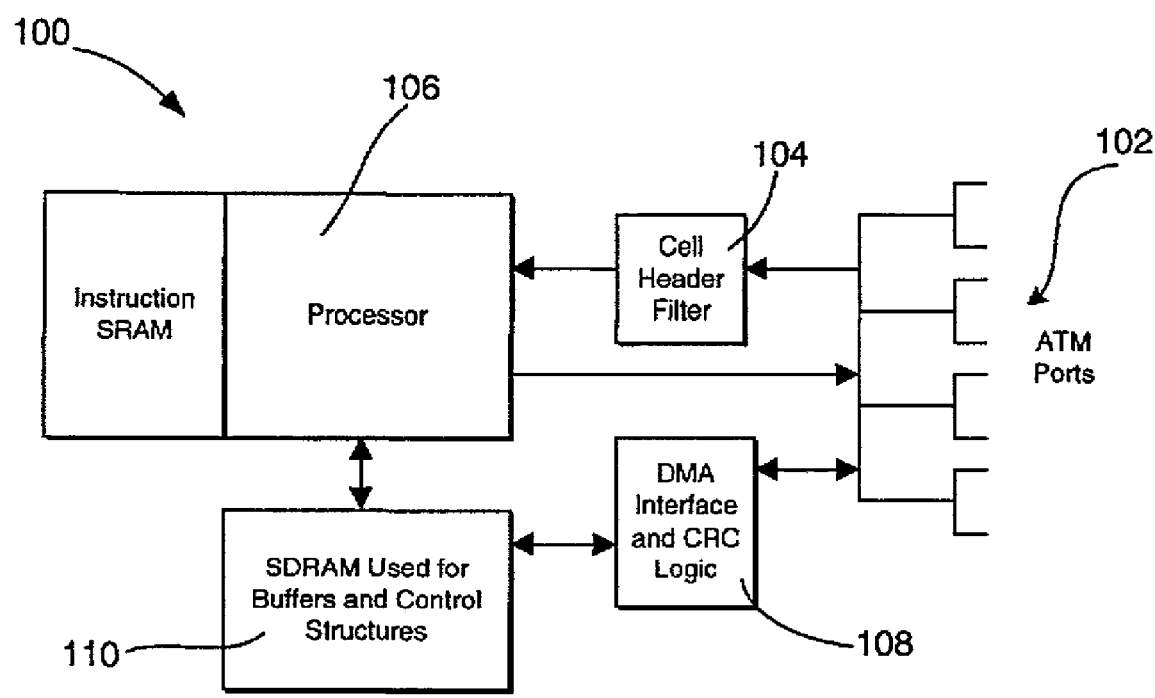
FIG. 1 is a generalized block diagram illustrating a cell switching system incorporating the present invention.

The following description is intended to convey a thorough understanding of the invention by providing a number of specific embodiments and details involving ATM processing and systems. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs. Referring to the Figures and, more particularly to FIG. 1, there is shown a generalized block diagram of an ATM cell switching system 100 incorporating the present invention. In particular, system 100 includes a plurality of ATM ports 102, a filter 104 for interpreting cell headers, a processor 106 with a dedicated static random access memory (SRAM) for its instructions, a direct memory access (DMA) interface 108, and hardware for calculating cyclic redundancy codes (CRC).

In operation, the processor 106 selects an input port 102 with a waiting received cell. The cell header filter 104 then inspects the cell header and decodes the VPI/VCI/PTI (PTI—payload type identifier) to determine the destination circuit, represented here by a data structure called a flow. Processor 106 then reads the cell body from the input port into a buffer 110 attached to the destination flow. The processor 106 then constructs the new (transmission) cell header by rewriting the VPI/VCI and other header fields as appropriate, and storing this header in the buffer 110. Next, the buffered cell (with rewritten header) is transmitted on the appropriate output port 102.

As described briefly above, every available ATM channel (virtual path or virtual circuit) is represented by a structure in memory referred to as a flow. A flow is a software structure used to hold the state of an ATM virtual path or virtual circuit. A flow may correspond to the endpoint of the VP or VC (i.e. where the data contained in the cell payload is handled). Alternatively, a flow may correspond to one stage in the decoding of the VPI/VCI in the cell header. Typically, a flow consists of state variables and the address of a handler function which handles a received cell on the VP or VC. In this exemplary implementation (which is only one of many possible implementations), a flow is a data structure of at least eight memory words long, with the first eight words arranged as shown below:

State variable 1
State variable 2
State variable 3
State variable 4
State variable 5
State variable 6
State variable 7
Handler function address
Further state variables In one implementation, loading eight words from memory into machine registers associated with the processor activates a flow, such that the first seven words are loaded into general-purpose registers, and the eighth is loaded into the processor's Program Counter register, forcing a branch to the associated handler function. It has been determined that this is a very efficient means of invoking a flow: a single machine instruction causes the handler function to be called, with the parameters it needs already loaded into registers.

This structure holds the current state of the channel, including:

This structure holds the current state of the channel, including:

static parameters (e.g. output port, priority, header rewriting rules)
the queue of buffered cells awaiting retransmission
the address of a routine to handle cell reception
the address of a routine to handle cell transmission
Early Packet Discard/Partial Packet Discard state for this channel
statistics (e.g. cell count)

It should be understood that some of the static parameters of the channel are implicit in the reception and transmission handler routines. There are separate routines for different types of channels, which allows efficient cell handling without having to test flow parameters for each cell.

Figure 2:
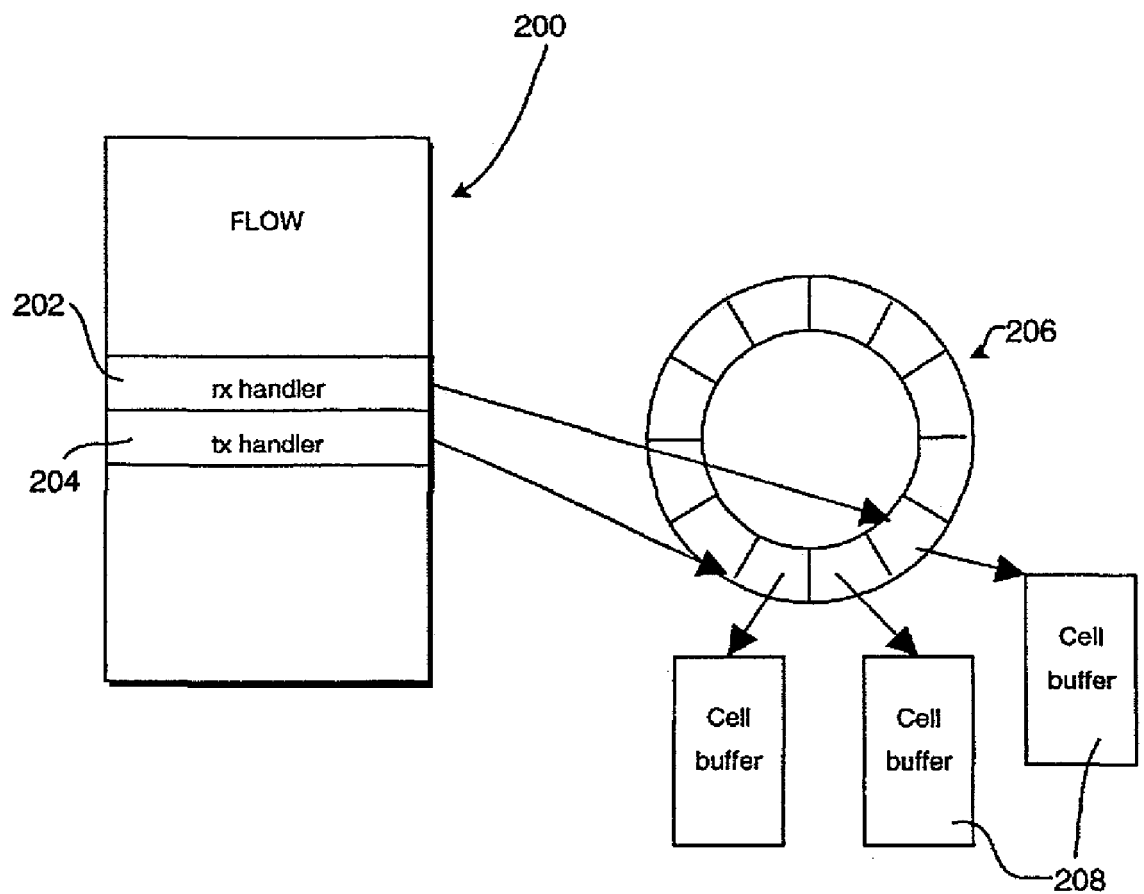
FIG. 2 is a block diagram illustrating one embodiment of a flow-buffering scheme of the present invention.

Referring now to FIG. 2, there is shown a block diagram illustrating one embodiment of a flow-buffering scheme configured in accordance with the present invention. In particular, an ATM flow is generally designated by numeral 200 and includes addresses for both a cell reception handler routine 202 and cell transmission handler routine 204. Further, each flow includes a circular array of cell buffer pointers generally designated by the numeral 206, used to implement a first-in-first-out (FIFO) queue of cells which have been received but not yet retransmitted. In one embodiment, this array of buffer pointers is of fixed size, automatically limiting the number of cells that can be queued for this VP or VC associated with the present flow. The size may be different for different channels. As a cell comes through for transmission, a cell buffer 208 is allocated and the pointer for the buffer is placed into the circular array.

In accordance with the present invention, incoming cells are received by the cell reception handler routine 202, modified according the their particular requirements for retransmission and placed into a cell buffer 208 within the FIFO circular array 206. Upon output port availability, the next pointer in the array 206 is reviewed to determined the location of the buffer holding the cell to be transmitted. This address location is then retrieved by the transmission handler routine 204 and the cell is forwarded for transmission.

Figure 3:
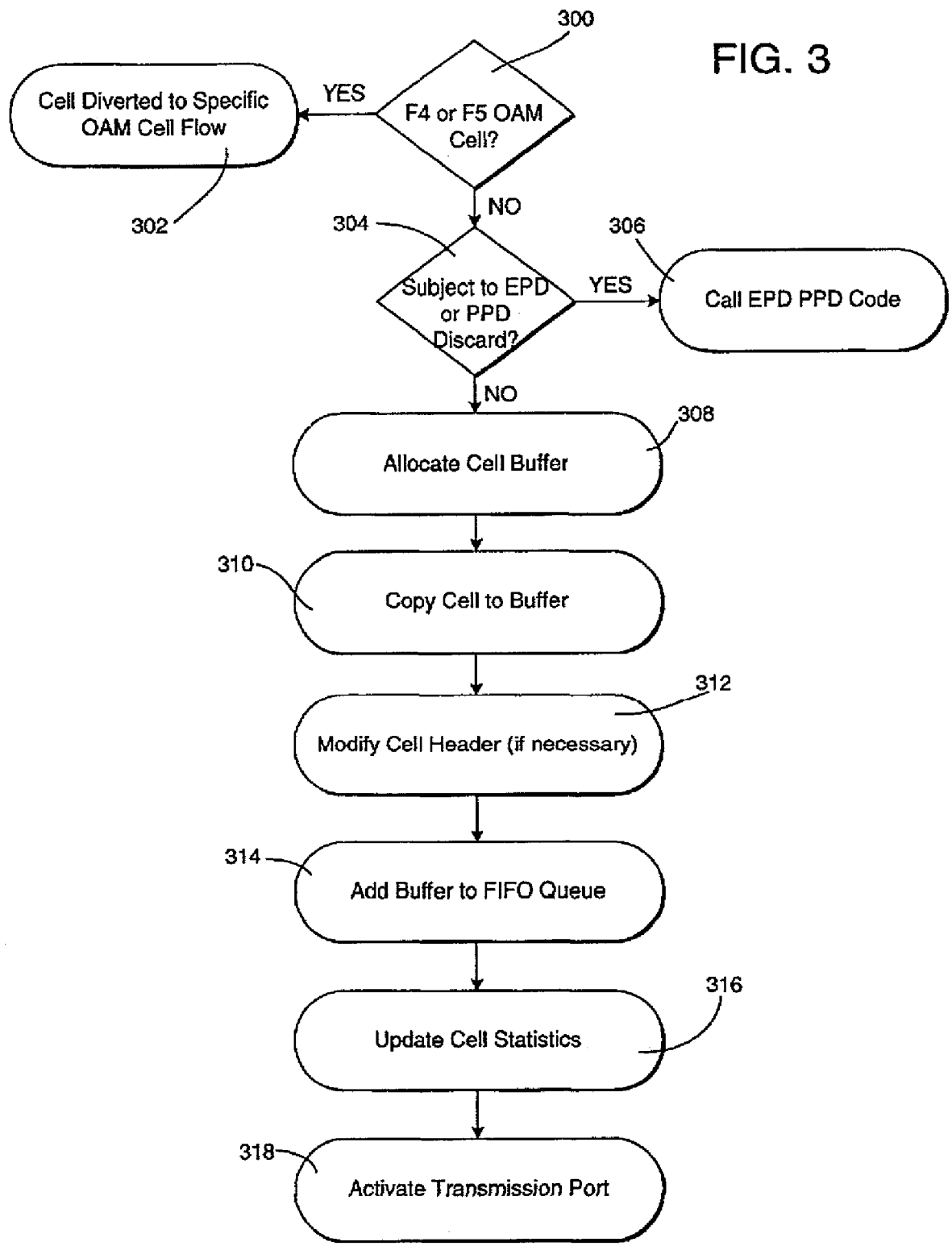
FIG. 3 is a flow diagram illustrating one embodiment of a method for switching an ATM cell in accordance with the present invention.

Returning briefly to FIG. 1, once an ATM cell's destination flow has been identified by the filter 104, the flow's cell reception handler routine is called to service the received cell. Generally, this results in the forwarding of the cell to a cell buffer queue for retransmission on an appropriate output port. However, in accordance with the present invention, several circumstances exist in which a cell is not placed into a flow's cell buffer queue for retransmission. Referring now to FIG. 3 there is shown a flow diagram illustrating one embodiment of a method for receiving and switching an ATM cell in accordance with the present invention. In step 300, the cell header is inspected to determine whether the received cell is an F4 or F5 OAM (Operations Administrations and Management) cell. This determination is typically made upon inspection of the header's PTI information. If it is determined that the cell is an OAM cell, then the cell is diverted to another flow in step 302, which specifically handles OAM cells. Checking for F4 and F5 cells at this stage means that only OAM cells belonging to configured ATM channels are intercepted. Next, if it is determined that the cell is not an OAM cell, it is determined in step 304 whether the received cell should be discarded due to the Early Packet Discard (EPD) or Partial Packet Discard (PPD) rules set forth in additional detail below. If so, EPD/PPD code is called in step 306 which results in the discarding of the received cell.

If the cell is neither an OAM cell nor subject to discard due to EPD/PPD rules, a cell buffer is allocated in step 308. In step 310, the cell is copied from the hardware input port to the buffer. Next, in step 312, modification of the cell header (if necessary) is done to ready the cell for retransmission on an associated output port. This may involve rewriting some fields of the header (e.g. VPI) while leaving others (e.g. VCI, PTI) unchanged, or may require rewriting the whole header. In step 314, the buffer is added to the FIFO queue attached to the flow. That is, a pointer to the buffer's location in inserted into the circular array described above. In step 316, cell statistics are updated, and in step 318, the transmission port is activated so that the cell eventually gets retransmitted.

Figure 4:
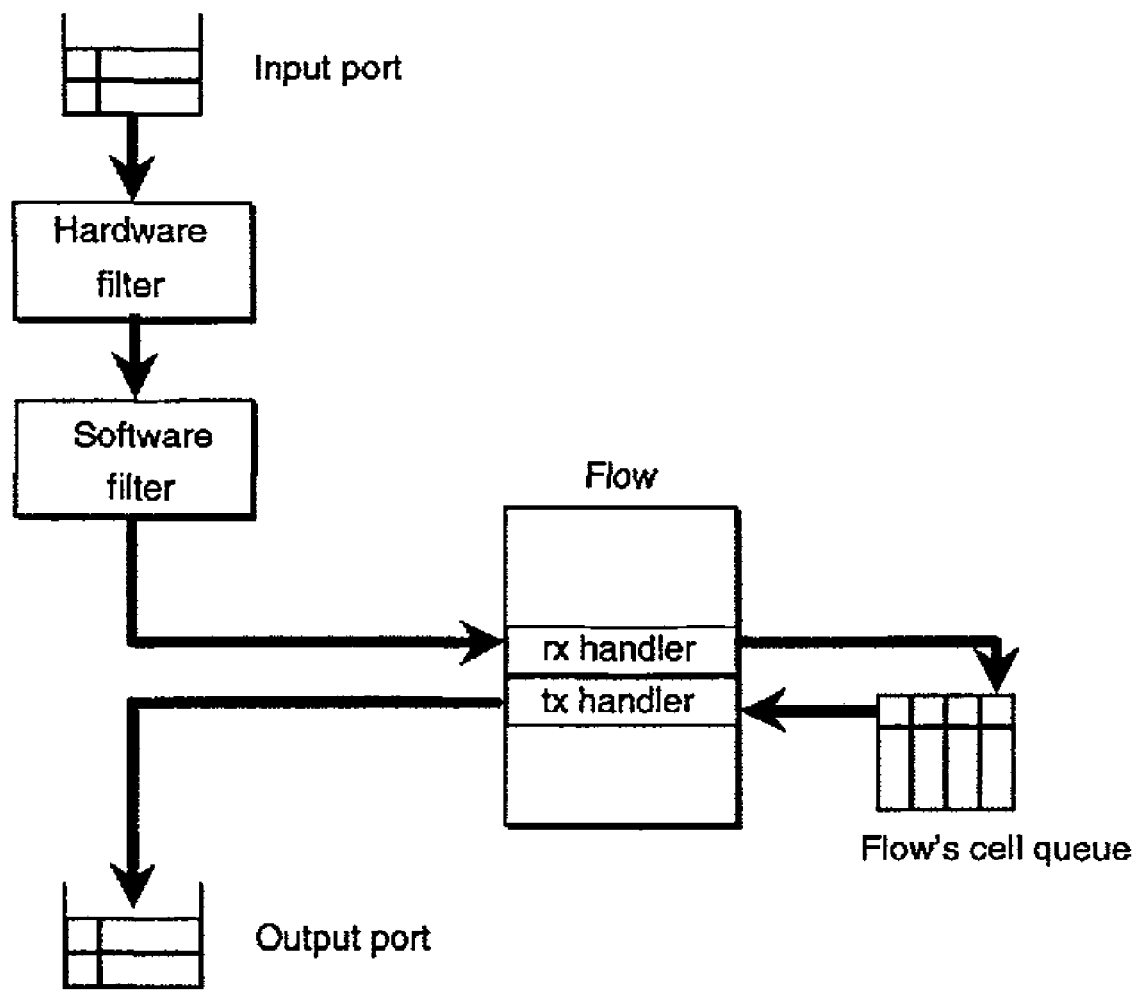
FIG. 4 block diagram illustrating one embodiment of a unicast switching scheme of the present invention.

Although the above described switching method is most easily implemented in a unicast manner, the present invention may also be utilized in cooperation with a multicast switching system. For unicast switching systems, received cells are queued on the flow corresponding to the identified VP or VC and then transmitted on the corresponding output port. In this scenario, each flow has only two handler routines, one to transfer a cell from an input port onto the flow's cell buffer queue (translating the header), and one to transmit the queued cell via the output port. One embodiment of a simplified unicast switching system is set forth in FIG. 4. For multicast switching systems, received cells are transmitted to a plurality of distinct output ports. There are two basic methods for implementing multicast switching: 1) Arranging for switched cells to tour round all the output ports, changing the cell header each time; and 2) making copies of the cell, one for each output port, with appropriate headers for each.

Figure 5:
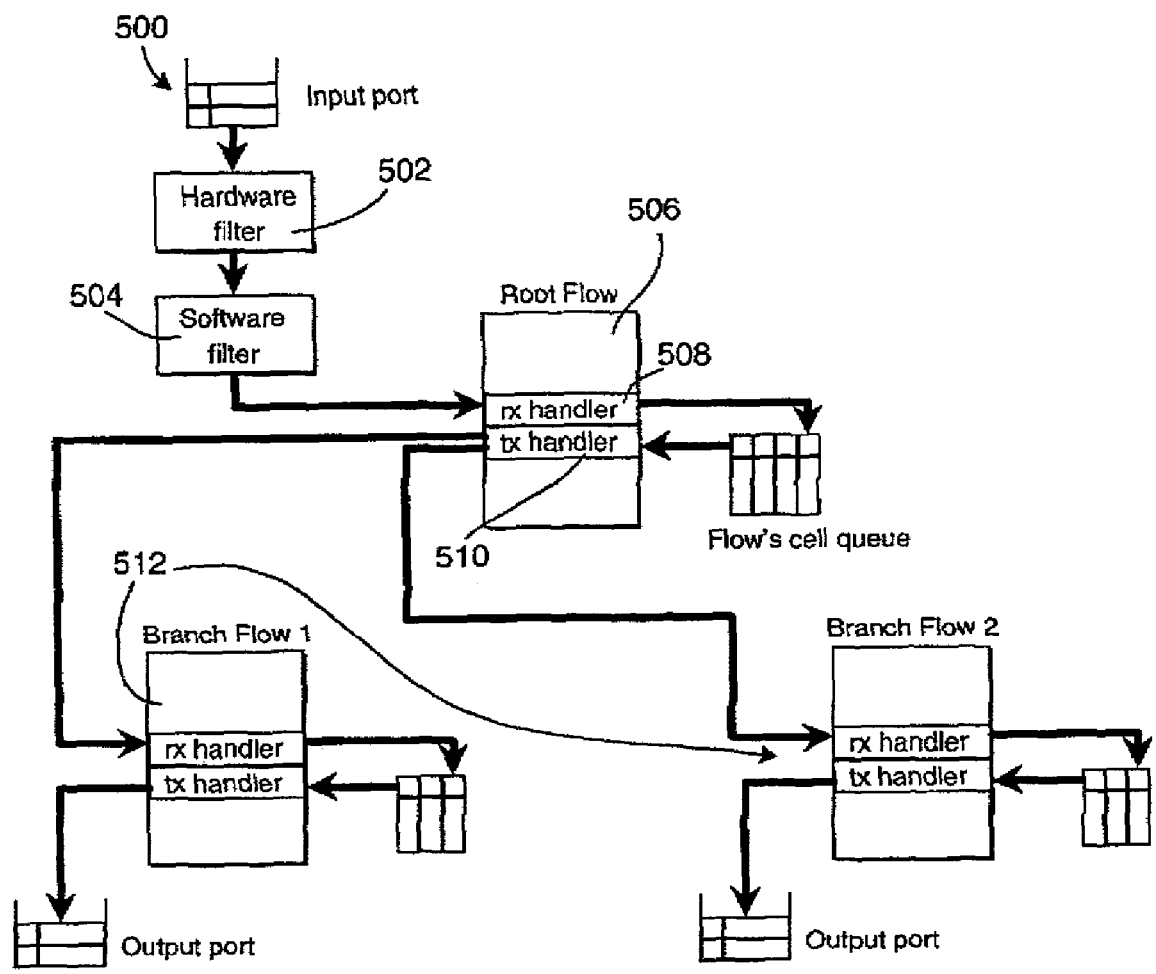
FIG. 5 is a flow diagram illustrating one embodiment of a method for multicast switching of ATM cells in accordance with the present invention.

Referring now to FIG. 5, there is shown one embodiment of a method for multicast switching of ATM cells in accordance with the present invention. In this embodiment, a cell is received at an input port 500 and filtered to identify its destination flow 506 by hardware filter 502 and, optionally, software filter 504. Once the cell's flow 506 has been identified, the flow's reception handler routine 508 is called to process the cell and prepare the cell for retransmission or termination if necessary. In the present embodiment, the second method of multicast cell switching is utilized, wherein received cells are replicated and delivered to each output port with an appropriate cell header. This is done since replicating cells is simpler than modifying cell headers continuously during switching. Further, this method leaves the output ports independent of one another. Unfortunately, cell replication cannot be done directly at the time of reception as this could take an excessive time for a reception operation, resulting in delayed servicing of other ports. Therefore, in accordance with the present invention, received cells are queued on a single "root" flow 506 exactly as for unicast circuits (except that the header is left unchanged at this stage).

Further, each branch of the system (which outputs to a distinct output port) of the multicast system is represented by a separate branch flow 512, and each activation of the root flow's transmission handler routine 510 copies the head queued cell (i.e., the next cell referenced by the FIFO array) to the next branch in turn. This divides the replication into small tasks more compatible with the processor's scheduling. It should be understood that not all branch flows 512 are necessarily switching flows, so this mechanism also supports multicasts with one or more locally terminated branches. Further, there can be more than one branch per transmission port. By breaking the multicast switching into small tasks, the processor can arrange for the scheduling of the multicast cell distribution along with its other tasks.

In one embodiment, this process may be accomplished by sacrificing one unused ATM port to drive the multicast distribution. Multicast root flows are set up as if this dummy port was their transmit port, but they never actually send anything to it. This allows the scheduling hardware to interleave multicast distribution with normal reception and transmission in a reasonable way. It should be understood that alternative methods exist for scheduling multicast transmission such as the use of timers and any suitable methodology is understood to be within the scope of the present invention.

Returning now to the above-described conditions relating to early packet discard (EPD) and partial packet discard (PPD), in many circumstances, it is possible for the cell queue of a particular circuit in an ATM switch to become overloaded. This happens, for example, when traffic is switched to a circuit faster than it can be transmitted. This may be caused by several occurrences. In particular, the physical speed of the output port may simply be slower than the associated input port. Further, congestion on the output port due to traffic from multiple sources may cause a delay in the transmission of a transmit queue. Also, limits imposed by the traffic parameters of a particular ATM circuit may also result in switch overload.

The effect of such an overload is that the number of cells buffered on the flow structure increases. Each cell buffer queue has a size limit (as described above), so eventually the queues for one or more flows become full and received cells have to be discarded until space becomes available again. If the data carried by the circuit consists of packets containing several ATM cells, indiscriminate discarding of cells in this way can have a significant and damaging effect on overall data throughput because the loss of one cell invalidates the whole of a multi-cell packet. For example, higher-level protocols may cause the corrupted packet to be transmitted again, so the surviving cells of the packet are switched unnecessarily (as they will eventually be discarded at their destination), thereby further contributing to the overload condition. Accordingly, it was noted that the overload behaviour of the system may be greatly improved if the ATM switch responds to congestion by discarding whole packets rather than individual cells. This prevents the unnecessary switching of packet cells which will eventually be discarded.

A common format for packet data on ATM circuits is AAL5, specified by the ATM Forum. In AAL5, data packets up to 64 Kbytes in length are carried in multiple cells. The only packet framing information is a marker carried in the final cell. The final cell also contains the length of the packet and a CRC checksum of the data. The switching scheme of the present invention may be implemented to support EPD and PPD algorithms to improve the handling of AAL5 packets on overloaded ATM circuits.

Figure 6:
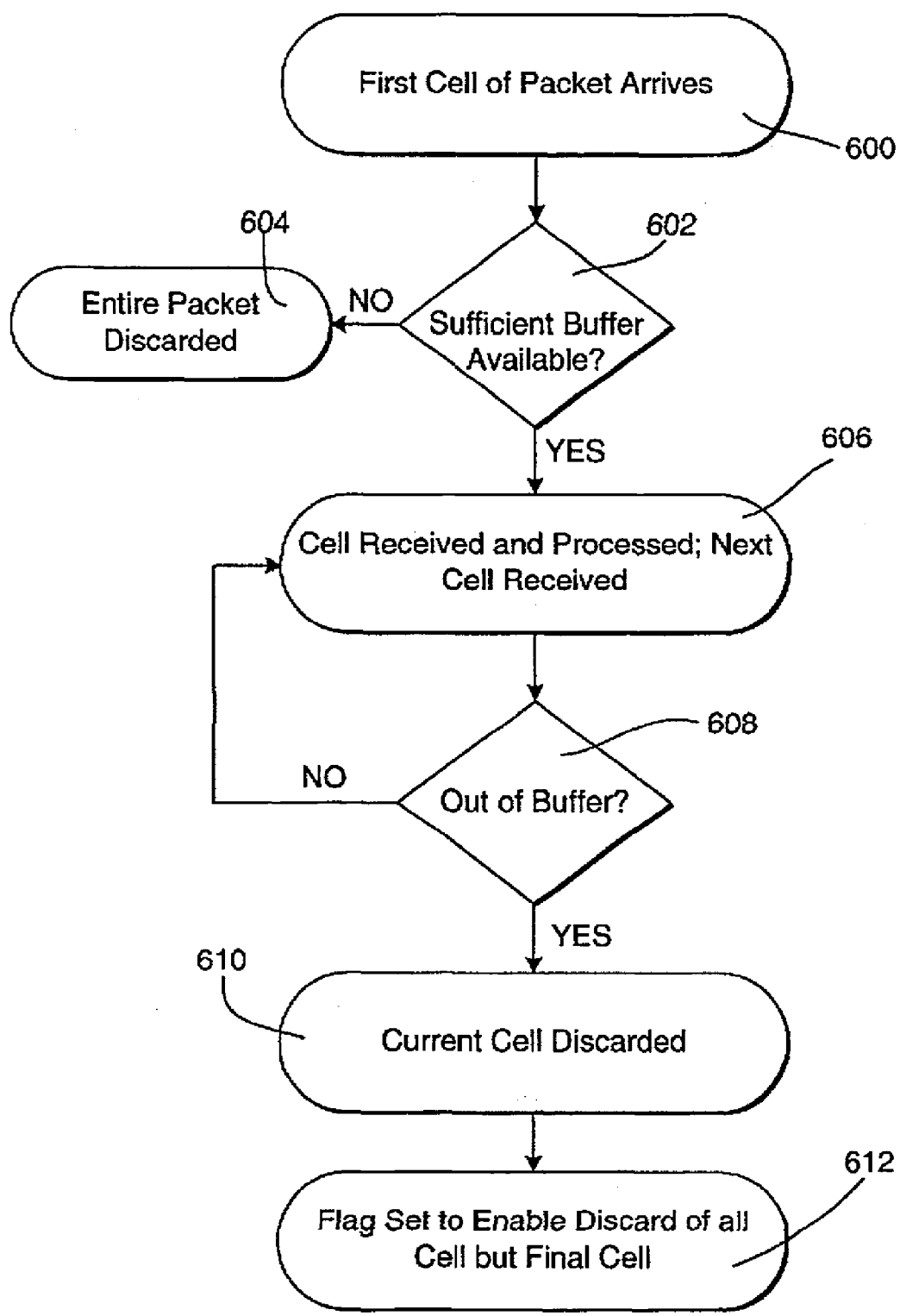
FIG. 6 is a block diagram illustrating one embodiment of a multicast switching scheme of the present invention.

Referring now to FIG. 6, there is shown a flow diagram illustrating one embodiment of a method for switching ATM cells using EPD. In step 600, a first cell of an AAL5 packet arrives. In step 602, it is determined whether, there is likely to be enough buffering available to handle the whole packet (i.e., up to 64 Kbytes). If it is determined that sufficient buffering is unlikely to be available, the entire packet is discarded in step 604. In one embodiment, the criterion for determining the likelihood of having sufficient buffer space is simply determining whether half of the flow's buffer capacity is already in use. If it is determined that there is not enough buffering available, it sets a flag in the flow structure to cause every cell in the packet to be discarded. If it is determined that sufficient buffering exists, the cell is received and buffered for subsequent transmission in step 606 and the system looks to the next cell in the packet.

Relating to congestion which occurs after the AAL5 packet transmission is initiated, it is determined in step 608 whether the flow's buffer is filled at any time after initial transmission of a AAL5 cell but before reception of the final cell. If such a state is determined, the current cell is discarded in step 610, and a flag is set in the flow structure in step 612 so that subsequent cells of the same packet, except the last, will also be discarded. PPD differs from EPD in that part of the packet has already been sent when the congestion is detected. Thus it is important to preserve the final cell, so the receiver can see where the damaged packet ends, and can discard it without affecting later packets.

This exemplary implementation uses four flags in the flow structure to control EPD and PPD:

| | |
|---|---|
| EPD_ACTIVE | Set to enable EPD/PPD on this flow |
| EPD_SEEN_END | Set when an end-of-AAL5-packet cell is received (so the next cell is assumed to be the start of a packet). This flag is cleared when any other cell is received. |
| EPD_DISCARD_PARTIAL | Set when buffer overflow occurs during a packet. Causes all further cells of the packet, except the final one, to be discarded. This flag is cleared when an end-of-packet cell is received. |
| EPD_DISCARD_WHOLE | Set on receiving the first cell of a packet (i.e. if EPD_SEEN_END is set) if the flow's data buffer is already half full. Causes all cells of the packet to be discarded. This flag is cleared when the EPD_SEEN_END flag is set. |

Although this description relates to AAL5 specifically, it should be understood that the scope of the present invention is not limited to this application and that other known ATM protocols are fully contemplated by the invention.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

What is claimed is:

1. An asynchronous transfer mode switch, comprising:
    a plurality of input/output ports for receiving and transmitting ATM cells;
    a cell header filter for decoding ATM cell headers to determine each cell's ATM channel;
    at least one processor for manipulating each ATM cell in response to the ATM channel identified by the cell header filter and outputting each of the manipulated ATM cells on one of the input/output ports; and
    at least one memory structure associated with the at least one processor for storing ATM cell data prior to transmission on one of the input/output ports,
    wherein each available ATM channel is represented by a flow data structure in the at least one memory structure, the flow data structure including a plurality of state variables associated with the ATM channel and further including memory addresses for a cell reception handler routine and a cell transmission handler routine, wherein the plurality of state variables include at least one variable selected from the group consisting of the following information: static parameters such as the ATM channel's output port, priority and cell header rewriting rules, a memory address to a queue of buffered cells awaiting transmission; the ATM channel's early packet discard/partial packet discard state, and channel statistics such as a count of cells passing through the channel.

2. The asynchronous transfer mode switch of claim 1, wherein the at least one memory structure further comprises:
    a plurality of cell buffers; and
    a plurality of first-in-first-out circular arrays respectively associated with the plurality of ATM channels for holding a plurality of cell buffer pointers,
    wherein, upon reception of an ATM cell on a particular ATM channel, the cell is placed into a selected one of the plurality of cell buffers and a cell buffer pointer pointing to the selected one of the plurality of cell buffers is placed into the first-in-first-out circular array associated with the ATM channel.

3. The asynchronous transfer mode switch of claim 2, wherein the plurality of first-in-first-out circular arrays respectively associated with the plurality of ATM channels have predetermined sizes based upon the respective ATM channel with which they are associated.

4. A method for switching asynchronous transfer mode cells, comprising the steps of:
  receiving an ATM cell at an input port;
  identifying an ATM flow associated with the received ATM cell, wherein the ATM flow includes at least memory addresses for an cell reception handler routine and a cell transmission handler routine;
  reading the contents of the ATM flow into a plurality of registers, including reading the memory address for the cell reception handler routine into a program counter register for immediate execution;
  determining whether the received ATM cell is subject to retransmission; and
  performing the following steps if it is determined that the received ATM cell is subject to retransmission:
    allocating a cell buffer;
    copying the cell contents from the input port to the allocated buffer;
    determining whether a circular array of buffer pointers associated with the identified ATM flow is full; and
    placing a pointer to the cell buffer into the circular array if it is determined that the circular array is not full.

5. The method of claim 4, further comprising the following steps:
  determining that an output port associated with the identified ATM flow is available;
  reading a next cell buffer pointer from the circular array into the cell transmission handler routine, the next cell buffer pointer indicating the memory address of the buffer holding the next cell for transmission on the output port; and
  transmitting the next cell on the output port.

6. The method of claim 4, wherein the step of determining whether the received ATM cell is subject to retransmission further comprising the steps of:
  determining whether the received ATM cell is an operations and management cell;
  diverting the received ATM cell to an operations and management flow if it is determined that the received ATM cell is an operations and management cell;
  determining whether the received ATM cell is a subject to packet discard;
  discarding the received ATM cell if it is determined that the received ATM cell is a subject to packet discard.

7. The method of claim 6, wherein the step of determining whether the received ATM cell is subject to packet discard further comprises the steps of:
  determining whether the received ATM cell is the first cell of a multi-cell packet;
  performing the following steps if it is determined that the received ATM cell is the first cell of a multi-cell packet:
    determining whether sufficient buffer space is available to handle the entire multi-cell packet;
    discarding the received ATM cell and all subsequent cells in the multi-cell packet if it is determined that the sufficient buffer space is not available to handle the entire multi-cell packet;
  performing the following steps if it is determined that the received ATM cell is not the first cell of a multi-cell packet:
    determining whether sufficient buffer space is available for the received ATM cell;
    discarding the received ATM cell and all subsequent cells except the last cell in the multi-cell packet if it is determined that sufficient buffer space is not available for the received ATM cell.

8. The method of claim 7, further comprising the steps of:
  determining whether an EPD_ACTIVE flag in the ATM flow associated with the received ATM cell has been set to enable or disable early packet discard or partial packet discard for the identified ATM flow;
  preventing packet discard if it is determined that an EPD_ACTIVE flag in the ATM flow associated with the received ATM cell has been set to disable.

9. The method of claim 7, wherein the step of determining whether the received ATM cell is the first cell of a multi-cell packet further comprises the step of determining whether an EPD_SEEN_END flag in the ATM flow associated with the received ATM cell has been set to indicate whether the next received cell is predicted to be the start of a new packet.

10. The method of claim 7, wherein the step of discarding the received ATM cell and all subsequent cells except the last cell in the multi-cell packet if it is determined that sufficient buffer space is not available for the received ATM cell further comprises the steps of:
  determining whether an EPD_DISCARD_PARTIAL flag in the ATM flow associated with the received ATM cell has been set to indicate that a buffer overload has occurred;
  discarding all received ATM cells for which the EPD_DISCARD_PARTIAL flag is set; and
  clearing the EPD_DISCARD_PARTIAL flag upon receipt of an end-of packet cell.

11. The method of claim 7, wherein the step of discarding the received ATM cell and all subsequent cells in the multi-cell packet if it is determined that the sufficient buffer space is not available to handle the entire multi-cell packet further comprises the step of:
  determining whether an EPD_DISCARD_WHOLE flag in the ATM flow associated with the received ATM cell has been set to indicate that a sufficient buffer space is not available to handle the entire multi-cell packet;
  discarding all received ATM cells for which the EPD_DISCARD_WHOLE flag is set; and
  clearing the EPD_DISCARD_PARTIAL flag upon the discard of an end-of packet cell.

12. The method of claim 7, wherein the step of determining whether sufficient buffer space is available to handle the entire multi-cell packet further comprises the steps of:
  determining whether half of the ATM flow's available buffer is filled; and
  setting a EPD_DISCARD_WHOLE flag in the ATM flow associated with the received ATM cell to indicate that a sufficient buffer space is not available to handle the entire multi-cell packet if it is determined that half of the ATM flow's available buffer is filled.

13. The method of claim 4, further comprising the steps of:
  determining that multicast switching of the received ATM cell to a plurality of output ports is required;
  identifying a plurality of branch flows associated with the ATM channel and the plurality of output ports;
  reading a next cell buffer pointer from the circular array into the cell transmission handler routine, the next cell buffer pointer indicating the memory address of the buffer holding the next cell for transmission; and
  replicating the next cell to each of the plurality of branch flows.

14. A computer readable medium incorporating instructions for switching asynchronous transfer mode cells, the instructions comprising:
  one or more instructions for receiving an ATM cell at an input port;
  one or more instructions for identifying an ATM flow associated with the received ATM cell, wherein the ATM flow includes at least memory addresses for an cell reception handler routine and a cell transmission handler routine;
  one or more instructions for reading the contents of the ATM flow into a plurality of registers, including reading the memory address for the cell reception handler routine into a program counter register for immediate execution;
  one or more instructions for determining whether the received ATM cell is subject to retransmission; and
  performing the following instructions if it is determined that the received ATM cell is subject to retransmission:
    one or more instructions for allocating a cell buffer;
    one or more instructions for copying the cell contents from the input port to the allocated buffer;
    one or more instructions for determining whether a circular array of buffer pointers associated with the identified ATM flow is full; and
    one or more instructions for placing a pointer to the cell buffer into the circular array if it is determined that the circular array is not full.

15. The computer readable medium of claim 14, the instructions further comprising:
  one or more instructions for determining that an output port associated with the identified ATM flow is available;
  one or more instructions for reading a next cell buffer pointer from the circular array into the cell transmission handler routine, the next cell buffer pointer indicating the memory address of the buffer holding the next cell for transmission on the output port; and
  one or more instructions for transmitting the next cell on the output port.

16. The computer readable medium of claim 14, wherein the one or more instructions for determining whether the received ATM cell is subject to retransmission further comprising the following instructions:
  one or more instructions for determining whether the received ATM cell is an operations and management cell;
  one or more instructions for diverting the received ATM cell to an operations and management flow if it is determined that the received ATM cell is an operations and management cell;
  one or more instructions for determining whether the received ATM cell is a subject to packet discard;
  one or more instructions for discarding the received ATM cell if it is determined that the received ATM cell is a subject to packet discard.

17. The computer readable medium of claim 16, wherein the one or more instructions for of determining whether the received ATM cell is subject to packet discard further comprises the steps of:
  one or more instructions for determining whether the received ATM cell is the first cell of a multi-cell packet;
  performing the following instructions if it is determined that the received ATM cell is the first cell of a multi-cell packet:
    one or more instructions for determining whether sufficient buffer space is available to handle the entire multi-cell packet;
    one or more instructions for discarding the received ATM cell and all subsequent cells in the multi-cell packet if it is determined that the sufficient buffer space is not available to handle the entire multi-cell packet;
  performing the following instructions if it is determined that the received ATM cell is not the first cell of a multi-cell packet:
    one or more instructions for determining whether sufficient buffer space is available for the received ATM cell;
    one or more instructions for discarding the received ATM cell and all subsequent cells except the last cell in the multi-cell packet if it is determined that sufficient buffer space is not available for the received ATM cell.

18. The computer readable medium of claim 17, further comprising the following instructions:
  one or more instructions for determining whether an EPD_ACTIVE flag in the ATM flow associated with the received ATM cell has been set to enable or disable early packet discard or partial packet discard for the identified ATM flow;
  one or more instructions for preventing packet discard if it is determined that an EPD_ACTIVE flag in the ATM flow associated with the received ATM cell has been set to disable.

19. The computer readable medium of claim 17, wherein the one or more instructions for determining whether the received ATM cell is the first cell of a multi-cell packet further comprises one or more instructions for determining whether an EPD_SEEN_END flag in the ATM flow associated with the received ATM cell has been set to indicate whether the next received cell is predicted to be the start of a new packet.

20. The computer readable medium of claim 17, wherein the one or more instructions for discarding the received ATM cell and all subsequent cells except the last cell in the multi-cell packet if it is determined that sufficient buffer space is not available for the received ATM cell further comprises the following instructions:
  one or more instructions for determining whether an EPD_DISCARD_PARTIAL flag in the ATM flow associated with the received ATM cell has been set to indicate that a buffer overload has occurred;
  one or more instructions for discarding all received ATM cells for which the EPD_DISCARD_PARTIAL flag is set; and
  one or more instructions for clearing the EPD_DISCARD_PARTIAL flag upon receipt of an end-of packet cell.

21. The computer readable medium of claim 17, wherein the one or more instructions for discarding the received ATM cell and all subsequent cells in the multi-cell packet if it is determined that the sufficient buffer space is not available to handle the entire multi-cell packet further comprises the following instructions:
  one or more instructions for determining whether an EPD_DISCARD_WHOLE flag in the ATM flow associated with the received ATM cell has been set to indicate that a sufficient buffer space is not available to handle the entire multi-cell packet;

one or more instructions for discarding all received ATM cells for which the EPD_DISCARD_WHOLE flag is set; and one or more instructions for clearing the EPD_DISCARD_PARTIAL flag upon the discard of an end-of packet cell.

22. The computer readable medium of claim 17, wherein the one or more instructions for determining whether sufficient buffer space is available to handle the entire multi-cell packet further comprises the following instructions:

one or more instructions for determining whether half of the ATM flow's available buffer is filled; and one or more instructions for setting a EPD_DISCARD_WHOLE flag in the ATM flow associated with the received ATM cell to indicate that a sufficient buffer space is not available to handle the entire multi-cell packet if it is determined that half of the ATM flow's available buffer is filled.

23. The computer readable medium of claim 14, further comprising the following instructions:

one or more instructions for determining that multicast switching of the received ATM cell to a plurality of output ports is required;

one or more instructions for identifying a plurality of branch flows associated with the ATM channel and the plurality of output ports;

one or more instructions for reading a next cell buffer pointer from the circular array into the cell transmission handler routine, the next cell buffer pointer indicating the memory address of the buffer holding the next cell for transmission; and one or more instructions for replicating the next cell to each of the plurality of branch flows.

* * * * *